(12) United States Patent
Pasquero et al.

(10) Patent No.: US 10,401,965 B2
(45) Date of Patent: Sep. 3, 2019

(54) METHOD OF PROVIDING TACTILE FEEDBACK AND APPARATUS

(71) Applicant: BlackBerry Limited, Waterloo (CA)

(72) Inventors: Jerome Pasquero, Montreal (CA); David Ryan Walker, Waterloo (CA); Michael Joseph Defazio, Fonthill (CA); Jason Tyler Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/230,632

(22) Filed: Dec. 21, 2018

(65) Prior Publication Data

US 2019/0179414 A1 Jun. 13, 2019

Related U.S. Application Data

(63) Continuation of application No. 15/428,030, filed on Feb. 8, 2017, now Pat. No. 10,162,419, which is a continuation of application No. 15/145,711, filed on May 3, 2016, now Pat. No. 9,588,589, which is a continuation of application No. 12/715,271, filed on Mar. 1, 2010, now Pat. No. 9,361,018.

(51) Int. Cl.
*G06F 3/01* (2006.01)
*G06F 1/16* (2006.01)
*G06F 3/0488* (2013.01)

(52) U.S. Cl.
CPC ............ *G06F 3/016* (2013.01); *G06F 1/1613* (2013.01); *G06F 3/04883* (2013.01); *G06F 2203/014* (2013.01); *G06F 2203/04105* (2013.01)

(58) Field of Classification Search
None
See application file for complete search history.

(56) References Cited

U.S. PATENT DOCUMENTS

| | | |
|---|---|---|
| 6,317,313 B1 | 11/2001 | Mosgrove et al. |
| 7,054,441 B2 | 5/2006 | Pletikosa |
| 7,194,086 B2 | 3/2007 | Pletikosa |
| 7,324,642 B2 | 1/2008 | Pletikosa |
| 9,361,018 B2 | 6/2016 | Defazio et al. |
| 9,588,589 B2 | 3/2017 | Pasquero et al. |
| 10,162,419 B2 | 12/2018 | Pasquero et al. |
| 2003/0174121 A1 | 9/2003 | Poupyrev et al. |

(Continued)

FOREIGN PATENT DOCUMENTS

| | | |
|---|---|---|
| CA | 2364529 A1 | 6/2002 |
| EP | 1587026 A1 | 10/2005 |

(Continued)

OTHER PUBLICATIONS

Canadian Patent Application No. 2729482, Examiners Report dated Jun. 9, 2014.

(Continued)

*Primary Examiner* — Kenneth B Lee, Jr.
(74) *Attorney, Agent, or Firm* — Borden Ladner Gervais LLP; Geoffrey deKleine

(57) ABSTRACT

A method includes detecting a query gesture and actuating, in response to the query gesture, an actuator to provide tactile feedback including information associated with the query gesture. The query gesture may be detected on a touch-sensitive display of a portable electronic device.

20 Claims, 7 Drawing Sheets

(56) References Cited

U.S. PATENT DOCUMENTS

| | | | | |
|---|---|---|---|---|
| 2007/0057913 | A1* | 3/2007 | Eid | G06F 3/016 345/156 |
| 2007/0268270 | A1 | 11/2007 | Onodera et al. | |
| 2008/0024459 | A1 | 1/2008 | Poupyrev et al. | |
| 2008/0238886 | A1* | 10/2008 | Bengtsson | G06F 3/016 345/177 |
| 2010/0004028 | A1* | 1/2010 | Park | H04M 1/72583 455/566 |
| 2010/0013653 | A1* | 1/2010 | Birnbaum | H04W 4/21 340/669 |
| 2011/0141052 | A1* | 6/2011 | Bernstein | G06F 3/016 345/174 |
| 2011/0191675 | A1* | 8/2011 | Kauranen | G06F 3/04847 715/702 |

FOREIGN PATENT DOCUMENTS

| | | |
|---|---|---|
| KR | 1020060085850 A | 7/2006 |
| WO | 2007033245 A2 | 3/2007 |
| WO | 2007128633 A1 | 11/2007 |

OTHER PUBLICATIONS

Canadian Patent Application No. 2729482, Examiners Report dated Mar. 8, 2013.
Canadian Patent Application No. 2729482, Examiners Report dated Nov. 8, 2013.
Canadian Patent Application No. 2729482, Notice of Allowance dated Sep. 15, 2015.
European Patent Application No. 10155066.3, Extended European Search Report dated May 24, 2011.
European Patent Application No. 17202927.4, Extended European Search Report dated Mar. 22, 2018.
Gizmodo, Retrieved from Internet [URL: http://gizmodo.com/gadgets/cellphones/haptic-clock-tells-you-th-time-via-vibrations-268217.php], Feb. 2010, 2 pages.
Korean Patent Application No. 10-2011-0017120, Office Action dated Aug. 20, 2012—English Translation Available.
Korean Patent Application No. 10-2011-0017120, Office Action dated Feb. 28, 2013—English Translation Available.
Non-Visual Inbox Summary for Mobile Communication Devices, Retrieved from Internet [http://www.faqs.org/patents/app/20080200149], Feb. 2010, 16 pages.
Retrieved from Internet [URL: http://www.techfresh.net/wp-content/uploads/2008/10/auguste-reymond-braille-hi-touch.pg], [retrieved on May 21, 2010], 1 page.
U.S. Appl. No. 15/145,711, Notice of Allowance dated Oct. 25, 2016.
U.S. Appl. No. 15/428,030, Non-Final Office Action dated Mar. 8, 2018.
U.S. Appl. No. 15/428,030, Notice of Allowance dated Aug. 16, 2018.

* cited by examiner

METHOD OF PROVIDING TACTILE FEEDBACK AND APPARATUS

FIELD OF TECHNOLOGY

The present disclosure relates to portable electronic devices, including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities. These devices run on a wide variety of networks from data-only networks such as Mobitex® and DataTAC® networks to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch screen display for input and output is particularly useful on such handheld devices, as such handheld devices are small and are therefore limited in space available for user input and output. Further, the screen content on touch-sensitive displays, also known as touch-screen displays, may be modified depending on the functions and operations being performed. These devices have a limited area for rendering content on the touch screen display and for rendering features or icons, for example, for user interaction. With continued demand for decreased size of portable electronic devices, touch-sensitive displays continue to decrease in size.

Improvements in touch-sensitive devices are therefore desirable.

DETAILED DESCRIPTION

Figure 1:
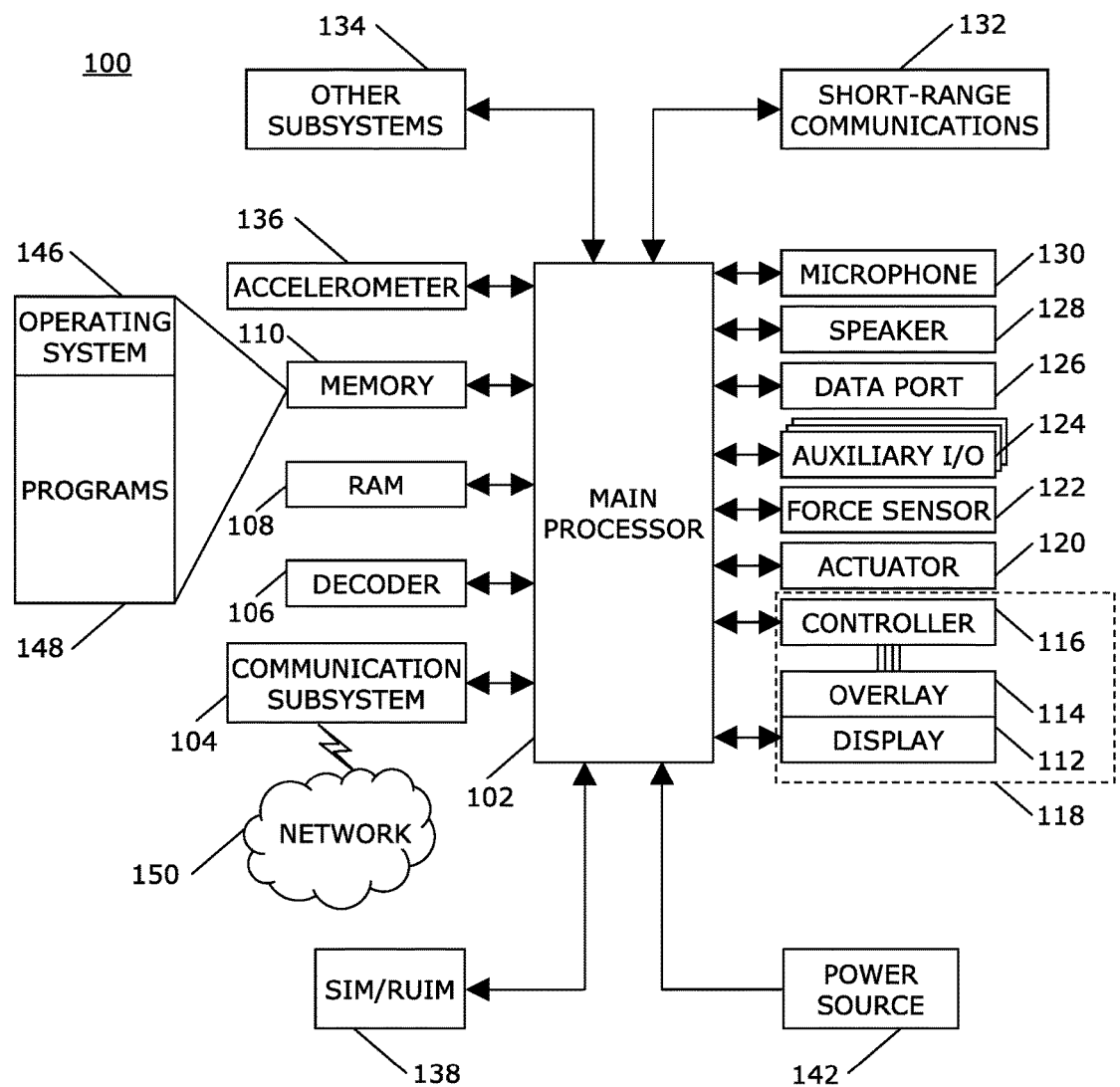
FIG. 1 is a block diagram of a portable electronic device in accordance with the disclosure.

A method and a portable electronic device are described for non-visually communicating information in response to detection of a query gesture on a touch-sensitive display of the portable electronic device. Tactile feedback is provided that communicates information related to the query gesture. The characteristics of the tactile feedback may vary based on one or more characteristics of the query gesture, such as a spatial location along a path of the gesture or a force with which the gesture is imparted on the touch-sensitive display.

Typically, most user interaction with a portable electronic device occurs when the user simultaneously views the display and operates the device. In many situations, such as during a conversation with another person or during a meeting, giving attention to a device is often considered impolite. A user may discreetly prompt the portable electronic device for information via a query gesture and receive the information related to the query gesture in the form of tactile feedback without looking at the device. Information may be obtained from the portable electronic device without removing the device from a pocket or a holster for the device.

In many devices, notifications are "pushed" when a pre-arranged event occurs, e.g., a reminder occurs fifteen minutes before a meeting start time, a chime occurs at the top of the hour, or a notification occurs when an email is received. These notifications may be ignored or not noticed by the user. The devices and methods in this disclosure advantageously facilitate a request, i.e., "pull," for information from the device at the user's convenience to obtain information that the user requests.

For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smart-phones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a display 112 with a touch-sensitive overlay 114 connected to an electronic controller 116 that together comprise a touch-sensitive display 118, an actuator 120, one or more force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed on a portable electronic device, is displayed or rendered on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the memory 110.

The portable electronic device 100 includes an operating system 146 and software components 148 that are executed by the processor 102 and are typically stored in an updatable persistent store such as the memory 110. Additional applications may be loaded onto the portable electronic device 100 through the wireless network 150, the auxiliary I/O subsystem 124, the data port 126, the short-range communications subsystem 132, or any other suitable device subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The location of the touch may be associated with information displayed, for example, via a graphical user interface. Further information about a touch, such as a contact area of the touch on the touch-sensitive display 118 or the pressure or force with which the touch is imparted on the touch-sensitive display 118 may be determined and provided to or by the processor 102. A touch or touch event may comprise one or more various actions, including, but not limited to, one or more contacts, contact including movement, contact over a period of time, and various combinations thereof. A gesture is a form of a touch.

The actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120.

Figure 2:
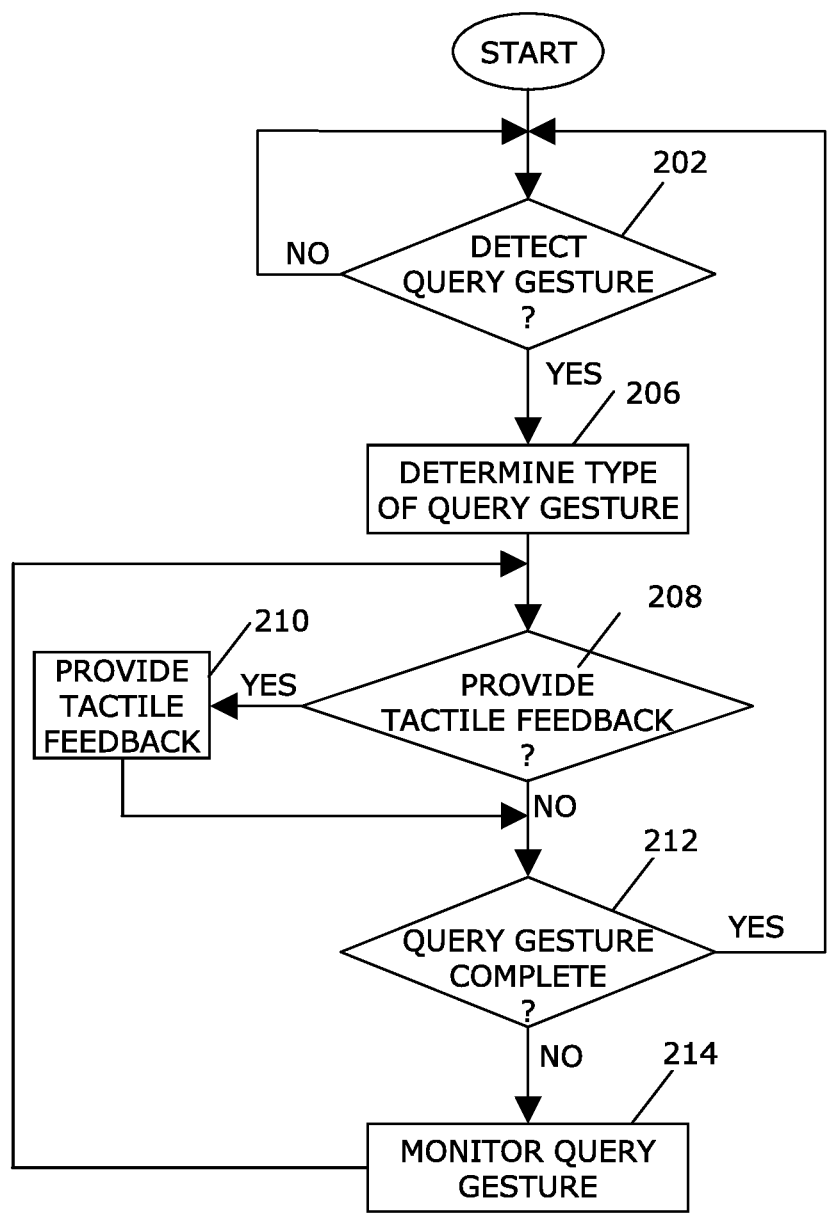
FIG. 2 is a flowchart illustrating a method of detecting a query gesture and providing tactile feedback in accordance with the disclosure.

A flowchart illustrating a method of detecting a query gesture and providing tactile feedback is shown in FIG. 2. The method may be carried out by software executed, for example, by the processor 102. Coding of software for carrying out such a method is within the scope of a person of ordinary skill in the art given the present description. The method may contain additional or fewer processes than shown and/or described, and may be performed in a different order.

A query gesture is a gesture that is interpreted as a request for information. A query gesture may include a touch event along a path over a period of time. The query gesture need not be associated with any information or element displayed on the touch-sensitive display 118. The force imparted on the display by the query gesture may be constant or may change over the path or period of time of the gesture. Alternatively, the query gesture may be provided via a trackball, trackpad, optical joystick, or other input device. The present disclosure describes the details of an embodiment in a touch-sensitive display.

When a query gesture is detected 202 on the touch sensitive display 118, the type of query gesture is determined 206. Each different type of query gesture requests different information. The type of query gesture may be determined by the touch-sensitive display 118 sending one or more signals conveying touch-related data to the controller 116 and/or the processor 102, which interpret and/or process the one or more signals to determine the type of gesture, for example, by interpreting one or more attributes of the gesture, such as the shape, location, length, duration, and so forth.

A specific area of touch-sensitive display 118 may be monitored for a query gesture. When a query gesture is detected in the area of the touch-sensitive display 118, the type of query gesture may be determined by the location of the gesture on the touch-sensitive display 118. The area may be comprised of one or more regions that may be adjacent or disjoint and that may be monitored for query gestures.

The portable electronic device 100 may be configured such that a query gesture may be detected anywhere on the touch-sensitive display 118. The gesture may be monitored for a period of time or over a distance of a path along the touch-sensitive display 118 before identifying which type, if any, query gesture is detected. For example, the initial segment of the path of multiple types of query gestures may be similar. The device 100 may need to continue monitoring the gesture until enough of the gesture is detected to accurately identify that the gesture is a type of query gesture. One type of query gesture may be detected from multiple different gestures, which may differ by one or more of shape, size, location, orientation, and so forth.

The query gesture may include an initial segment that identifies the type of query gesture and an information-providing segment during which tactile feedback may be provided. A period of time may elapse between the initial segment and the information-providing segment during which time contact with the touch-sensitive display 118 may break off.

The portable electronic device 100 may be configured to identify only one type of query gesture. In this situation, determining the type of query gesture 206 may be unnecessary or may involve simply detecting the query gesture on the touch-sensitive display 118.

The query gesture may be continuously or periodically monitored throughout the process. The monitored characteristics of the query gesture may include the current spatial location of the query gesture on the touch-sensitive display 118, the current force of the query gesture on the touch-sensitive display 118, the time or rate at which the query gesture or aspects of the query gesture occur, the number of simultaneous touch contacts with the touch-sensitive display 118, and so forth.

A determination is made 208 whether to provide tactile feedback to communicate information in response to the query gesture. When tactile feedback is provided 210, the actuators 120 may be actuated to provide tactile feedback that may be based on one or more characteristics of the query gesture. The actuators 120 may provide tactile feedback comprising any combination of vibration, one or more pulses, or other types of tactile feedback that communicate information requested by the query gesture. The information requested by the query gesture may be obtained from an application that may or may not be running, and/or from the memory storing information associated with the application, such as a calendar, email, or clock application. The query gesture may be monitored periodically or continuously, and the tactile feedback may vary, and may temporarily cease, throughout the duration of the query gesture.

When the gesture is not complete at 212, the query gesture is monitored 214, for example, the gesture characteristics are obtained and interpreted as described above, and the process continues at 208. When the query gesture is complete at 212, the process continues at 202. During a single query gesture, tactile feedback may be generated numerous times and/or in various ways. Optionally, a mode of operation may be entered, for example, automatically when no activity occurs for a period of time or by menu selection, wherein monitoring for query gestures is turned on or established as a primary function, for example, in a user profile.

Examples of various query gestures are shown in FIG. 3 through FIG. 6. Numerous other types and paths of query gestures may be utilized, and other types of tactile feedback may be provided in response to the query gestures, and/or different information may be communicated via the tactile feedback than associated with these examples. The paths of various query gestures 302, 402, 502, 602 that request the current time are illustrated by arrows. In each example, the current time is 6:45 PM.

Figure 3:
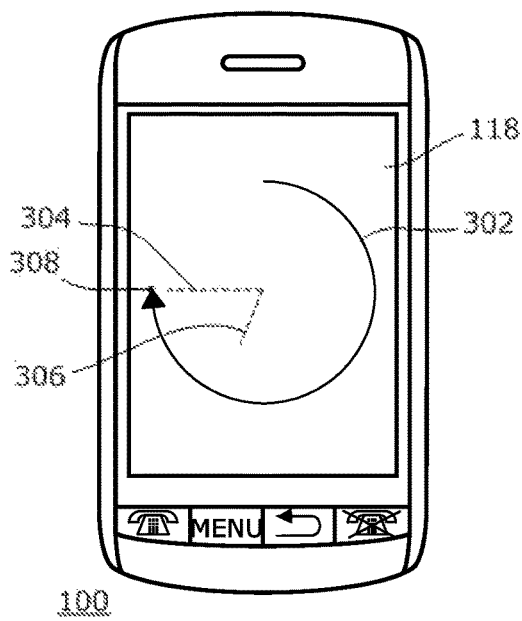
FIG. 3, FIG. 4, FIG. 5, FIG. 6, and FIG. 7 illustrate various query gestures on a touch-sensitive display in accordance with the disclosure.
Figure 4:
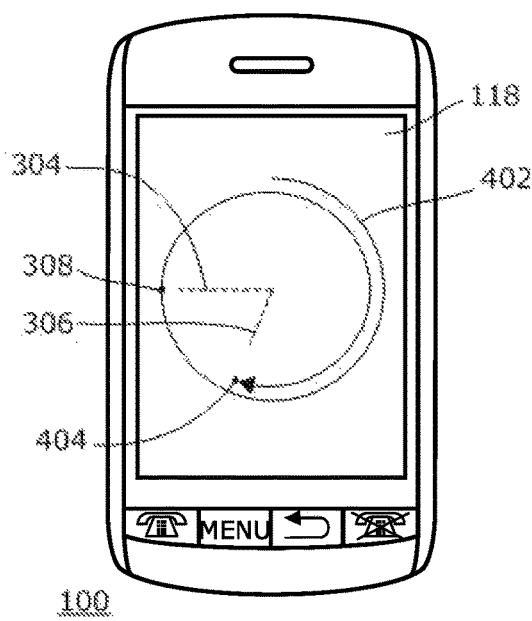
Figure 5:
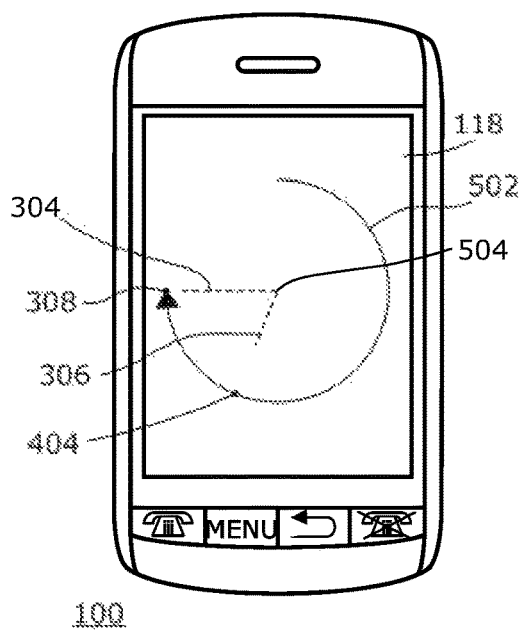

The paths of the query gestures 302, 402, 502 in FIG. 3 through FIG. 5 are generally angular or circular in direction and may be considered to resemble the face of a clock. The radius of the circular or angular query gesture need not remain constant throughout the query gesture. The angular direction of the gesture, e.g., clockwise or counterclockwise, may represent different types of query gestures or the same type of query gesture. A minute hand 304 and an hour hand 306 that meet at a point on the clock are shown by dotted lines to illustrate the time components of hours and minutes. Information may not be displayed such that operation of the portable electronic device 100 is not readily apparent. Although information related to the gesture need not be displayed, the portable electronic device 100 may display clock hands or other information in response to detecting the query gesture.

Each of the query gestures 302, 402, 502, 602 illustrates different query gestures and/or combinations of locations along the query gesture at which tactile feedback may be generated. The provision of the tactile feedback is based, at least in part, on a location within the query gesture 302, 402, 502 as the query gesture is detected and monitored in the examples shown in FIG. 3 through FIG. 5.

Although the locations are identified as points in the figures, a location may comprise an area, region, or line on the touch-sensitive display 118 and may be bounded in any of a number of ways. For example, a location may comprise an angular location, within an angular range, relative to a point 504, such as the center of the circle drawn as a clock face, regardless of the radial distance of an actual point of detection to the point 504.

As shown in FIG. 3, the query gesture 302 starts 12 o'clock and proceeds clockwise to a location 308 that angularly corresponds to the location of the minute hand 304, which is the 45-minute location in this example. The actuators 120 provide tactile feedback when the touch is at the 45 minute location 308 within the query gesture 302.

A user may have a general idea of the current time, e.g., the current hour, but may not know a more specific aspect of the time, i.e., the current minutes. Tactile feedback may be provided such that during the first rotation of the query gesture 302, the minute aspect of the time is communicated. As the path of the query gesture 302 angularly approaches the current hour hand 306, no tactile feedback is provided, but as the path of the query gesture 302 reaches the minute hand 304 associated with 45 minutes, tactile feedback is provided. Alternatively, the actuators 120 may provide substantially constant tactile feedback that starts when the query gesture 302 is detected and stops when the location 308 related to the information is reached.

When the query gesture continues clockwise in a generally circular direction, such as in FIG. 4, the current hour information is provided, for example, after the query gesture extends 360 degrees and at a location 404 associated with the relevant hour. Such a gesture is useful when a user is interested in knowing the current hour and minute. During the first 360 degrees of the query gesture, tactile feedback is provided at the location 308 that corresponds to the angular position of 45 minutes, i.e., the minute hand 304. After the query gesture extends 360 degrees, tactile feedback is provided at a location 404 associated with the hour, i.e., 6 PM, which corresponds to the angular position of the hour hand 306. The tactile feedback may be provided at a location associated with the location of the hour hand, such as ¾ of the way between 6 PM and 7 PM as shown in FIG. 4. Alternatively, tactile feedback may be provided at the location at which the reference numeral for the corresponding hour is located on a clock face, e.g., the reference numeral "6" on a clock face.

By utilizing locations during two separate rotations, tactile feedback may be provided to quickly and unambiguously provide the minute and hour of the current time. Although a single rotation around a circle may be utilized to provide the time, discerning tactile feedback when the minute and hour hands are aligned or nearly aligned may be difficult unless special tactile feedback is devised for such times. Utilizing a second rotation spaces the tactile feedback for the minute and the hour. Angularly spacing the locations 308 and 404 at which tactile feedback is provided advantageously helps the user to differentiate between the tactile feedback that communicates the time components associated with the minute location 308 and hour location 404. When the query gesture extends beyond 720 degrees, the feedback may be provided again, minutes during the next revolution and hours in the subsequent revolution.

Tactile feedback associated with the minute and the hour may be provided for a query gesture that extends less than 360 degrees in a circular direction. For example, as shown in FIG. 5, tactile feedback may be provided at the hour location 404 corresponding to the position of the hour hand 306 and tactile feedback may be provided at the minute location 308 corresponding to the position of the minute hand 304, within the initial 360 degree path of the query gesture 502. The tactile feedback generated at each of the locations 308, 404 may be different from one another such that the feedback is clearly identifiable with one of the time components. For example, tactile feedback that includes long pulses may be associated with the hour and tactile feedback that includes short pulses may be associated with the minute. A third type of feedback, such as a vibration or alternating long and short pulses may be utilized when the minute hand and the hour hand coincide, such as at midnight or noon. When the query gesture extends beyond 360 degrees, the feedback may be provided again at the same locations 308, 404.

The tactile feedback may convey information other than by provision at the spatial location of the hour and minute of the current time on a circular reference. The tactile feedback may comprise a plurality of blocks, segments, or pulses that indicate additional information. For example, the tactile feedback provided at the 45-minute location 308 may include a series of nine pulses, each representing 5-minute blocks of time, to further indicate the 45-minute aspect of time. Alternatively, while at the minute location 308, a number of pulses may be provided to indicate the hour, which, in this example, is six. A code may be utilized to shorten the communication of the hour, where each long pulse represents two hours and a short pulse represents one hour, such that no more than six pulses are provided.

Although FIG. 3 through FIG. 5 show the 12 o'clock location as oriented toward the top of the portable electronic device 100, relative to the orientation of the drawing, the clock may be absolute or relative in orientation to the touch-sensitive display 118 on the portable electronic device 100. Any point at which the query gesture starts may be designated as the 12 o'clock location, and the relative locations of the minute and hour accordingly angularly adjusted. Alternatively, a particular direction may be designated as the 12 o'clock location.

Figure 6:
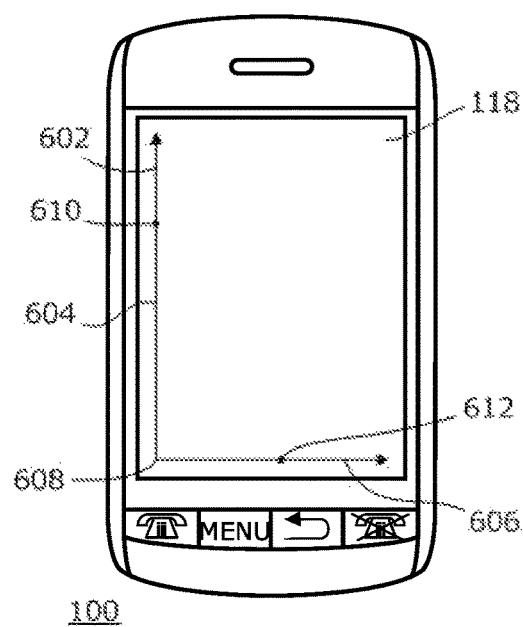

Non-circular gestures may be interpreted as query gestures that request an indication of the time, such as the L-shaped gesture 602 in FIG. 6. In FIG. 6, an L-shaped gesture 602 replaces a circular gesture as in FIG. 3 through FIG. 5, with each axis 604, 606 representing a component of the current time, i.e., the minute or the hour. The distance along each axis 604, 606 from the origin 608 provides an indication of time, e.g., proportional to how the minute or hour extends from the 12 o'clock location. For example, the distance along the y axis 604 from the origin 608 may indicate the number of minutes, while the distance along the x axis 606 from the origin 608 may indicate the number of hours. When a gesture is spatially located at a location 610 along the y axis 604, tactile feedback is generated to indicate that this percentage 75% of the distance along the y axis 604 corresponds to the amount of rotation, e.g., 270 degrees out of 360 degrees at the 45 minute location. Tactile feedback may be provided along the x axis 606 at a location 612 to indicate the hour, where 50% of the distance along the x axis 606 corresponds to 50% of rotation around a circle, e.g., 180 degrees or 6 o'clock. Although the minute axis may be advantageously placed along the longer of the axes to provide finer detail regarding the minute information, the axes may be oriented differently.

Figure 7:
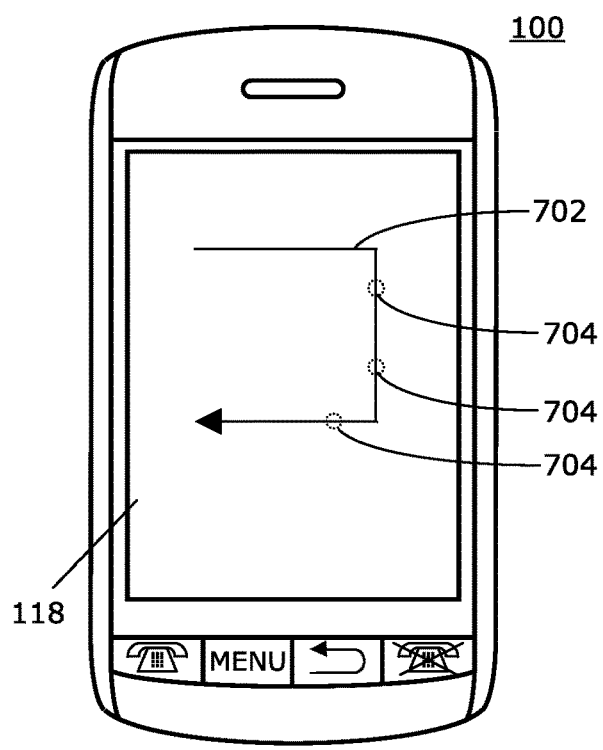

Query gestures may request other information, such as how many unread emails are in an email inbox or how many missed calls have registered in a given time period. A rectangular or nearly rectangular gesture 702 may return the number of unread emails via tactile feedback, e.g., one pulse provided per unread email, such as shown in FIG. 7. This information may be conveyed as a series of tactile pulses, illustrated as dots 704 in FIG. 7, in some other form such as the strength of a vibration, or any tactile stimulation, including those described herein. A user enterable setting may provide that each pulse represents a quantity of unread emails, such as one, two, three, four, and so forth. Optionally, the query gesture of a rectangle may be identified from a gesture comprising less than four sides of a rectangle, e.g., after a right angle in the touch is detected or after three sides of a rectangle are detected. The information may be repeated, for example, when the touch is continued another revolution around the rectangle or by discontinuing the gesture and starting the gesture again. Other shapes of gestures may represent other functions. For example, a triangle gesture may provide the number of missed calls. A query gesture shaped like the number 8 or infinity may indicate how many SMS or text messages are unread or unanswered. One or more user enterable settings that identify, for example, the form or nature of tactile feedback, whether or not query gestures are monitored upon holster detection, and other parameters may be stored in the device 100.

When information is provided via tactile feedback in response to the query gesture, the tactile feedback may begin as soon as a relevant part of the gesture is detected, e.g., half a circle, right turn for a rectangular gesture, sharp turn for a triangle, extra revolution, and so forth. Alternatively, the tactile feedback may begin when any touch is detected in a predetermined region, such as a corner of the device or a region aligned with a guide on a holster, or when a touch actuates a switch or actuator 120 or meets a touch threshold, e.g., force, duration, and so forth. The tactile feedback may be provided as long as the query gesture continues or alternatively may end when the information has been provided. Information may be repeated at various points of a continued query gesture, e.g., on a new revolution of the gesture. Tactile feedback may also be discontinued when the gesture stops, whether or not all the information was conveyed. For example, a user may only care when more than five unread emails are present, and may discontinue the query gesture after tactile feedback indicates five, e.g., after five pulses. In this situation, the tactile feedback may be discontinued, e.g., to save battery charge. Information provided in the form of pulses may be provided, for example, at equal time intervals, e.g., every 200 ms or 500 ms, or at equal distances, e.g., every 5 mm or every 10 mm. When the information requested is zero, e.g., no unread emails or missed calls, tactile feedback may have a different characteristic than the information, e.g., a very high frequency vibration or a varying frequency vibration. Such tactile feedback may be provided to acknowledge the query gesture and to communicate that the number is zero.

Figure 8:
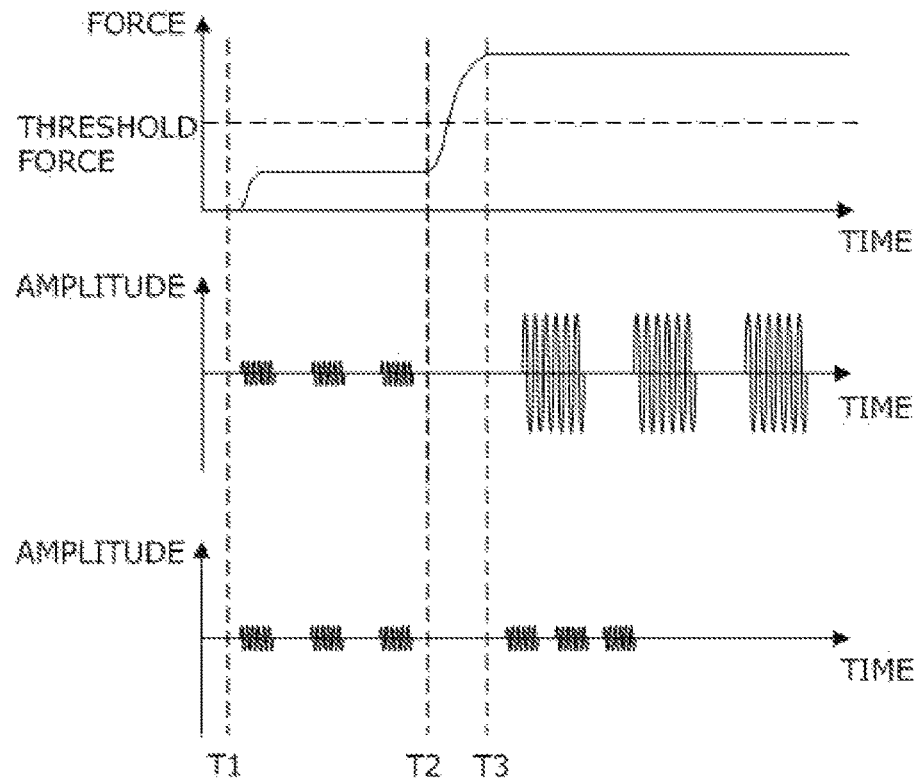
FIG. 8 illustrates graphs of force of a query gesture on a touch-sensitive display and the tactile feedback provided in response to the query gesture in accordance with the disclosure.

Graphs of force of a query gesture on a touch-sensitive display 118 and the tactile feedback provided are shown in FIG. 8. For example, a query gesture may request information related to the number of unread emails when three emails are unread. When the query gesture is imparted at a force below a force threshold, the tactile feedback is provided at a lower magnitude, for example, three lower magnitude vibrations between times T1 and T2. As shown in the upper graph, the force of the query gesture increases and stays past the force threshold between time T2 and T3. At a force above the force threshold, the tactile feedback is provided at a higher magnitude, for example, three vibrations at a magnitude distinctly higher than the lower magnitude, after time T3. Information may be repeatedly provided via tactile feedback as long as the query gesture is provided. The tactile feedback may have a different characteristic at different times when the information is provided.

In addition to changing the amplitude of the tactile feedback, the force imparted by the query gesture may also affect the frequency at which the tactile feedback is delivered. The change in frequency may be in place of, or in addition to, a change in the amplitude of the tactile feedback as shown in FIG. 8.

By altering the force imparted by the query gesture, a characteristic of the tactile feedback and the information conveyed by the tactile feedback may be modified. For instance, when the tactile feedback includes groups of pulses that indicate time, as described in the example above, altering the force of the query gesture may increase or decrease the rate or frequency at which the pulses or vibration of the tactile feedback are provided, such as shown in the lower graph of FIG. 8, and/or the magnitude or strength of the pulses or vibration of the tactile feedback, such as is shown in the middle graph of FIG. 8. Alternatively, an increased force may, for instance, change the level of detail of the information. For instance, at a given location and at a force below the threshold, each pulse may represent 5-minutes of time. At the same location, but at a force above the threshold, each pulse of the tactile feedback may represent one minute or provide more detailed or granular information. Alternatively, tactile feedback may be provided based on distance along the path of the query gesture.

Although FIG. 8 illustrates examples of changing the characteristic of the tactile feedback when the query gesture is made above or below a force threshold, multiple force thresholds may optionally be utilized or the relationship between a characteristic of the query gesture and the characteristic of the tactile feedback may have a continuous, discrete, or other type of functional relationship. For instance, a monotonic function may relate a force with which the query gesture is applied to the rate or speed at which pulses representing the quantity of emails or other information are delivered. The greater the detected force, the faster the pulses are generated. Force may be proportional, or inversely proportional, to the rate, duration, amplitude, and/or frequency of pulses or other tactile feedback characteristic. Alternatively, tactile feedback may be proportional to the speed of the gesture on the touch-sensitive display 118.

Figure 9:
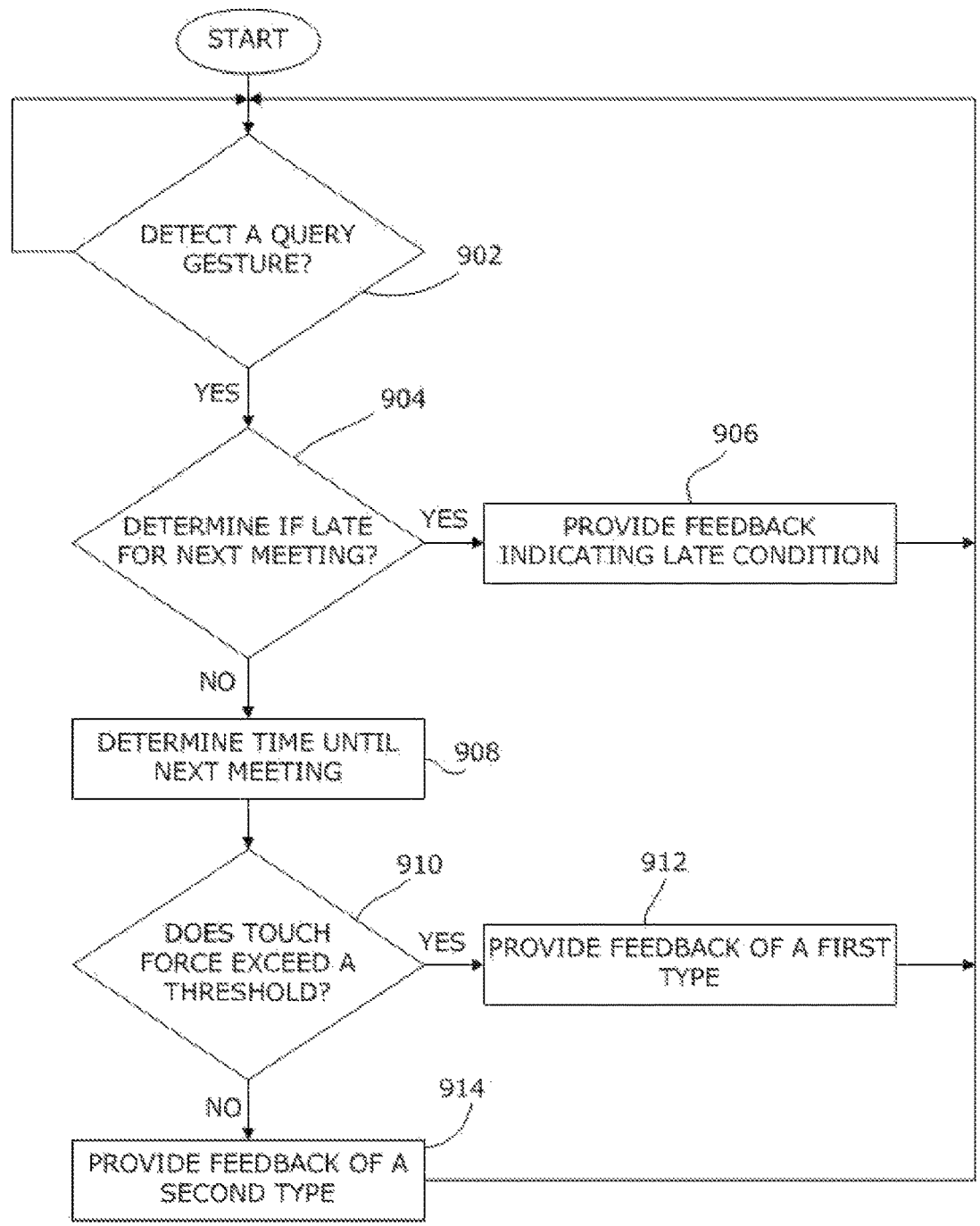
FIG. 9 is a flowchart illustrating a method of conveying meeting information in accordance with the disclosure.

A flowchart illustrating a method for conveying meeting information is shown in FIG. 9. The method may be carried out by software executed, for example, by the processor 102. Coding of software for carrying out such a method is within the scope of a person of ordinary skill in the art given the present description. The method may contain additional or fewer processes than shown and/or described, and may be performed in a different order.

When a query gesture is detected 902 on the touch-sensitive display 118, the query gesture is identified as a query for the time until the next scheduled meeting or other scheduled event in this example. A query gesture may be detected when the query gesture is in a predetermined location on the touch-sensitive display 118, such as one aligned with the small circular guide 706 as described above, or may be a gesture such as a counterclockwise circle or a square drawn at any location on the touch-sensitive display 118.

The portable electronic device 100 determines 904 whether a meeting has been missed. When a meeting has already begun, tactile feedback is provided 906 to indicate that the next meeting has already started and that the user is late. This tactile feedback may be, for example, a strong or high-frequency vibration, high-magnitude pulse or pulses, and so forth to impart the criticality of the information. Other conditional logic may also be utilized in the determination of whether the user is late.

When the user is not late at 904, the time until the next scheduled meeting is determined 908. The information may be provided in pulses or vibrations or groups of pulses or vibrations that represent 1 minute, 5 minutes, 15 minutes, and so forth. Stronger pulses or vibration may indicate a meeting time drawing near and weaker pulses or vibration may indicate a meeting that is further away.

Before providing the tactile feedback communicating the time to the next meeting, the device 100 may determine whether or not the force of the query gesture exceeds 910 a force threshold. When the force of the query gesture is above the force threshold, a first type of feedback, such as a series of quick pulses or high frequency vibrations may be provided 912. When the force of the query gesture is below the force threshold, a second type of feedback, such as a series of slow pulses or low frequency vibrations with greater spaces existing between them may be generated 914.

Various different types of actuators 120 may be utilized to provide tactile feedback including, for example, piezoelectric actuators, vibrator motors, dome-type switches, hydraulic actuators, linear resonant actuators, electromechanical actuators, magnetic actuators, and so forth. An example of providing tactile feedback through piezo actuators is shown in FIG. 10 through FIG. 13. The tactile feedback may be provided as any combination of one or more pulses, vibration, change in friction, high-force thump, and so forth.

Figure 10:
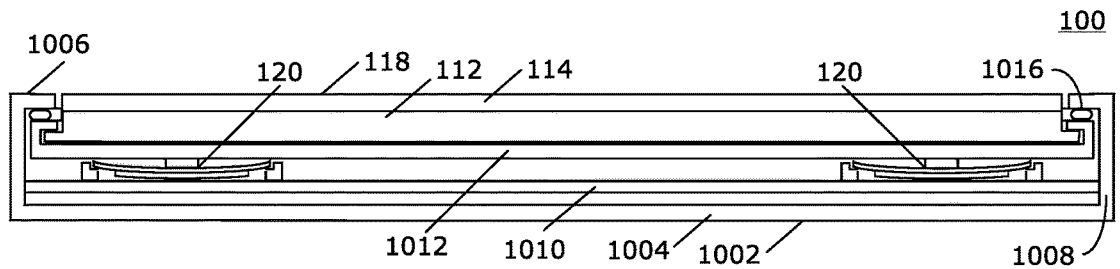
FIG. 10 is a sectional side view of a portable electronic device with piezoelectric actuators in accordance with the disclosure.

A sectional side view of a portable electronic device 100 with piezoelectric ("piezo") actuators 120 is shown in FIG. 10. The cross section is taken through the centers of the actuators 120. The portable electronic device 100 includes a housing 1002 that encloses components such as shown in FIG. 1. The housing 1002 may include a back 1004 and a frame 1006 that houses the touch-sensitive display 118. Sidewalls 1008 extend between the back 1004 and the frame 1006. A base 1010 extends between the sidewalls 1008, generally parallel to the back 1004, and supports the actuators 120. The display 112 and the overlay 114 are supported on a support tray 1012 of suitable material, such as magnesium. Spacers 1016 may be located between the support tray 1012 and the frame 1006. The spacers 1016 may advantageously be flexible and may also be compliant or compressible, and may comprise gel pads, spring elements such as leaf springs, foam, and so forth.

Figure 11:
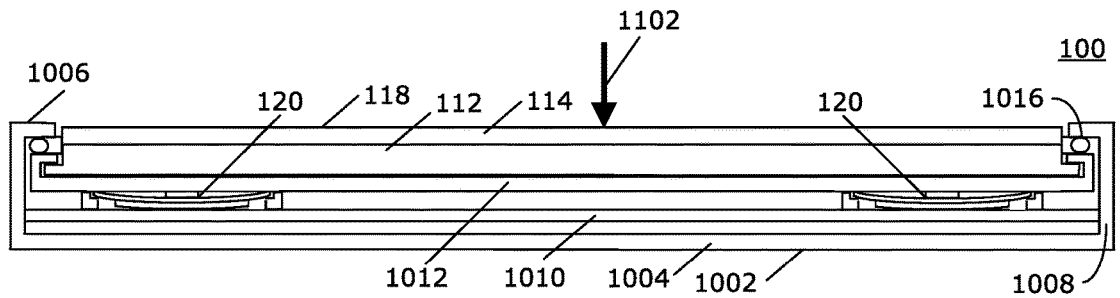
FIG. 11 is a sectional side view of a portable electronic device with a depressed touch-sensitive display in accordance with the disclosure.

The touch-sensitive display 118 is moveable and depressible with respect to the housing 1002. A force 1102 applied to the touch-sensitive display 118 moves, or depresses, the touch-sensitive display 118 toward the base 1010, and when sufficient force is applied, the actuator 120 is depressed or actuated as shown in FIG. 11. The touch-sensitive display 118 may also pivot within the housing to depress the actuator 120. The actuators 120 may be actuated by pressing anywhere on the touch-sensitive display 118. The processor 102 receives a signal when the actuator 120 is depressed or actuated.

Figure 12:
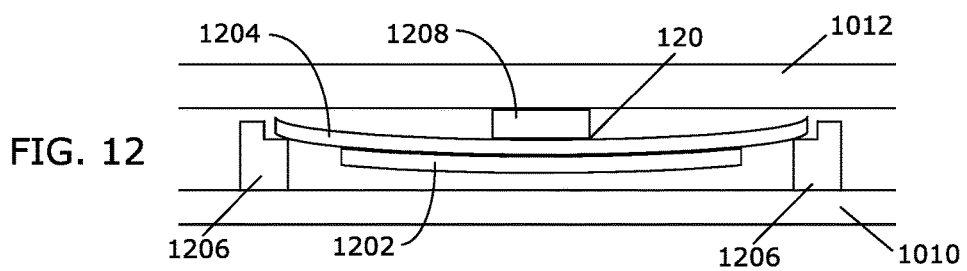
FIG. 12 is a sectional side view of a piezoelectric actuator in accordance with the disclosure.

A sectional side view of a piezo actuator 120 is shown in FIG. 12. The actuator 120 may comprise one or more piezo devices or elements 1202. The cross-section of FIG. 12 is taken through the center of one of the piezo actuators 120 utilized in this example. The piezo actuator 120 is shown disposed between the base 1010 and the touch-sensitive display 118. The piezo actuator 120 includes a piezoelectric element 1202, such as a piezoelectric ceramic disk, fastened to a substrate 1204, for example, by adhesive, lamination, laser welding, and/or by other suitable fastening method or device. The piezoelectric material may be lead zirconate titanate or any other suitable material. Although the piezo element 1202 is a ceramic disk in this example, the piezoelectric material may have any suitable shape and geometrical features, for example a non-constant thickness, chosen to meet desired specifications.

The substrate 1204, which may also be referred to as a shim, may be comprised of a metal such as nickel or any other suitable material such as, for example, stainless steel, brass, and so forth. The substrate 1204 bends when the piezo element 1202 contracts diametrically, as a result of build up of charge at the piezo element 1202 or in response to a force, such as an external force applied to the touch-sensitive display 118.

The substrate 1204 and piezo element 1202 may be suspended or disposed on a support 1206 such as a ring-shaped frame for supporting the piezo element 1202 while permitting flexing of the piezo actuator 120 as shown in FIG. 12. The supports 1206 may be disposed on the base 1010 or may be part of or integrated with the base 1010, which may be a printed circuit board. Optionally, the substrate 1204 may rest on the base 1010, and each actuator 120 may be disposed, suspended, or preloaded in an opening in the base 1010. The actuator 120 is not fastened to the support 1206 or the base 1010 in these embodiments. The actuator 120 may optionally be fastened to the support 1206 through any suitable method, such as adhesive or other bonding methods.

A pad 1208 may be disposed between the piezo actuator 120 and the touch-sensitive display 118. The pad 1208 in the present example is a compressible element that may provide at least minimal shock-absorbing or buffering protection and may comprise suitable material, such as a hard rubber, silicone, and/or polyester, and/or may comprise other materials such as polycarbonate. The pad 1208 may provide a bumper or cushion for the piezo actuator 120 as well as facilitate actuation of the piezo actuator 120 and/or one or more force sensors 122 that may be disposed between the piezo actuators 120 and the touch-sensitive display 118. The pad 1208 does not substantially dampen the force applied to or on the touch-sensitive display 118. The pad 1208 is advantageously aligned with a force sensor 122. When the touch-sensitive display 118 is depressed, the force sensor 122 generates a force signal that is received and interpreted by the microprocessor 102. The pads 1208 facilitate the focus of forces exerted on the touch-sensitive display 118 onto the force sensors 122. The pads 1208 transfer forces between the touch-sensitive display 118 and the actuators 120, whether the force sensors 122 are above or below the pads 1208. The pads 1208 are advantageously flexible and resilient, and facilitate provision of tactile feedback from the actuators 120 to the touch-sensitive display 118.

Figure 13:
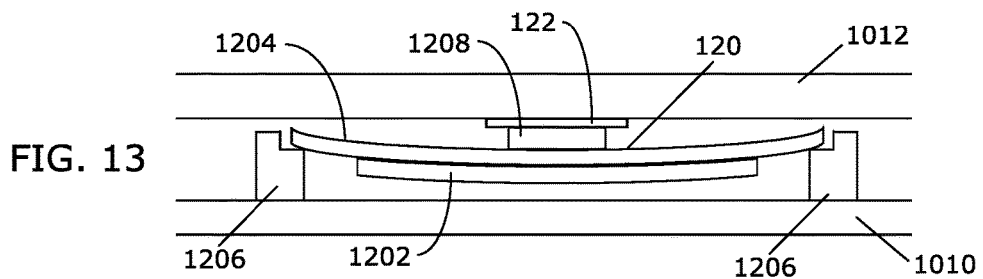
FIG. 13 is a sectional side view of a piezoelectric actuator with a force sensor in accordance with the disclosure.

An optional force sensor 122 may be disposed between the piezo actuator 120 and the touch-sensitive display 118 as shown in FIG. 13. The force sensor 122 may be disposed between the touch-sensitive display 118 and the pad 1208 or between the pad and the piezo actuator 120, to name a few examples. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. A piezoelectric device, which may be the piezo element 1202, may be utilized as a force sensor.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 14:
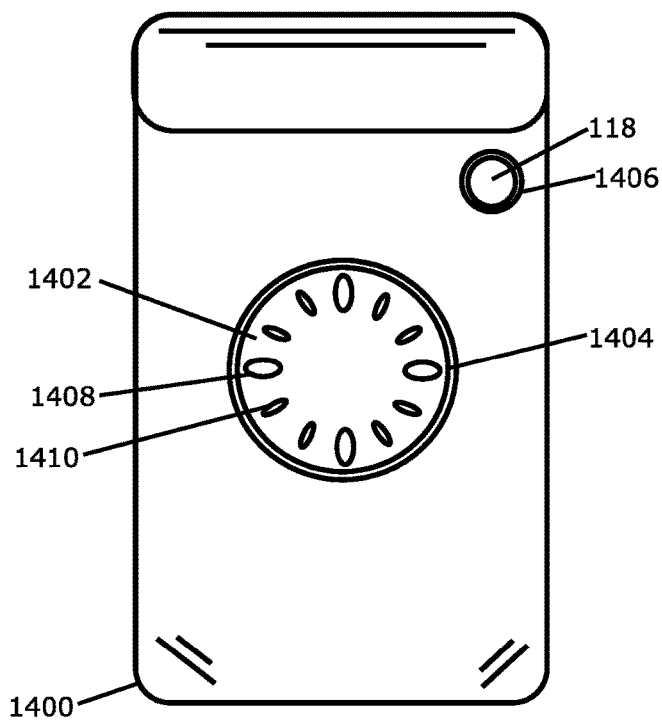
FIG. 14, FIG. 15, and FIG. 16 illustrate various holsters for a portable electronic device in accordance with the disclosure.
Figure 15:
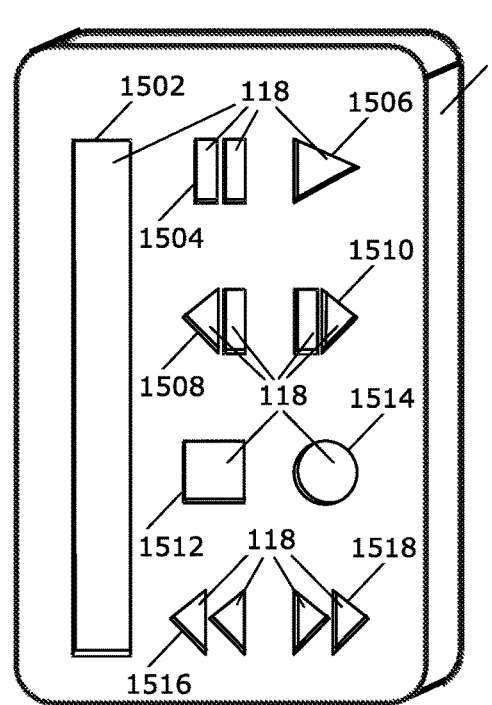
Figure 16:
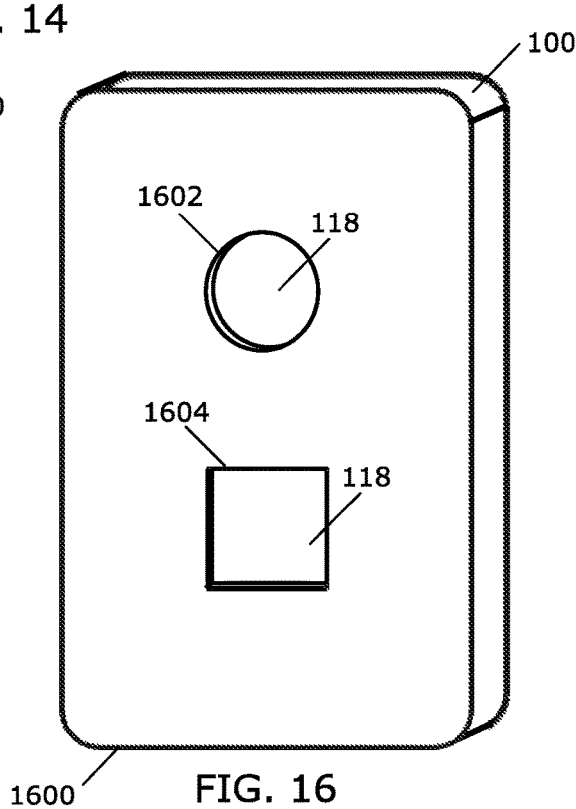

A holster may be arranged and constructed to guide or receive a query gesture while the portable electronic device 100 is disposed in the holster 1400, 1500, 1600 as shown in FIG. 14, FIG. 15, or FIG. 16. The holster 1400, 1500, 1600 comprises a body with one or more guides at locations aligned with an area comprised of one or more regions of the touch-sensitive display 118. The guides are locatable by touch, i.e., tactilely locatable, and may be, for example, holes or openings disposed in the holster 1400, 1500, 1600; shapes that are embossed, engraved, etched, carved, or otherwise formed in or on a surface of the holster 1400, 1500, 1600; components attached to or formed onto the surface of the holster 1400, 1500, 1600; and so forth. The guides may optionally be labeled with tactile information, such as Braille characters, to identify the relevant function, e.g., play music, or information requested, e.g., provide current time. The guides may be shaped to reflect the nature of the information queried or the function to be performed. For example, a circle represents a clock for time, a rectangle represents an envelope for email, and various triangles, rectangles, and/or circles represent media functions such as play, pause, or stop. A holster may include guides for various different and unrelated functions, such as emails and time, or may include guides for various related functions, such as media player controls or user profile settings, e.g., vibrate all, user busy, or forward calls. The holster 1400, 1500, 1600 may optionally include a clip with a spring return and a pivotable coupling between the holster and the clip. An optional flap, such as shown in FIG. 14, may extend over the top of the touch-sensitive device 100 to more securely hold the device in the holster 1400 and to protect more of the device 100. The holster has a thickness sufficient to detect a relevant touch or gesture, for example, for a capacitive touch sensor to detect a touch on the outer surface of the holster, for a resistive touch sensor to detect a press, or for a switch or actuator to be actuated or engaged.

Different holsters may have different guides that may be associated with different functions, different information, and/or different tactile feedback. Advantageously, different holsters may have mutually exclusive locations for their guides and the respective regions on the touch-sensitive display 118. Similar functions on different holsters may be aligned with the region of the display 118. An identifier may be associated with the holster to identify the functions associated with the holster as well as the locations of the guides on the holster. When the identifier is identified, the guide locations, and their associated area on the touch-sensitive display 118, are identified. Thus, the area to be monitored for query gestures may be based on the identifier, which area is aligned with one or more guides of the holster when the device 100 is holstered. The identifier may be entered into the device 100 manually by the user. Optionally, the identifier may be read by the device 100 from information embedded in the holster, such as a information stored in a microchip or RF tag, information read from a tactile barcode by detection of one or more touches along the sections of the tactile barcode, or arrangement of magnets read by one or more Hall effect sensors.

The guides provide easy location and/or access to an area of the touch-sensitive display 118 that may be monitored for a query gesture while the portable electronic device 100 is holstered. Although the device 100 may enter a reduced power mode when holstered, query gesture detection may remain active. To save power when holstered, the device 100 may turn off illumination of the touch-sensitive display 118 as well as disengage other features to facilitate power reduction. To minimize power consumption, the device 100 may optionally monitor for touches within an area that takes up less than the entire area of the touch-sensitive display 118, rather than monitoring for touches on the total area of the touch-sensitive display 118. The area monitored may comprise one or more regions of the touch-sensitive display 118, which regions need not be connected or adjacent to one another. The guides are advantageously aligned with these monitored regions of the area. Each monitored region may be associated with a different query, e.g., time of day, unread emails, missed phone calls, and so forth. A query gesture may be detected, for example, when the location of a touch coincides with a monitored region of the area. Such a touch may occur when a user touches the touch-sensitive display 118 through a guide that may be a hole or opening or when a touch at the location of a guide depresses or activates an actuator 120 and/or meets a force threshold. For example, when the region of the touch-sensitive display 118 is associated with providing information related to the current unread email count in an inbox, detection of a query gesture in this region of the area results in provision of tactile feedback that identifies the number of unread emails.

Optionally, when the portable electronic device 100 is detected as disposed in a holster, query detection may be activated. Alternatively, query detection may be manually activated. Detection of holstering may occur, for example, when one or more magnets disposed in the holster are detected by a Hall effect sensor in the device 100.

The example holster 1400 of FIG. 14 includes a large guide 1404 that guides a query gesture, for example, related to the current time and a small guide 1406 for guiding a query gesture related to another type of information, such as the time to a next meeting, as described in more detail with respect to FIG. 9, or a statistic related to email or voicemail service, e.g., an unread or unheard message count. Other shapes may be utilized for the guides. When a query gesture traces the outline of one of the guides 1404, 1406, or alternatively when a touch is detected inside or within the boundaries of one of the guides 1404, 1406, the query gesture is more quickly detected when monitoring for a query gesture is focused on the regions associated with the guides 1404, 1406. Alternatively, other touches within the regions associated with the guides 1404, 1406 may result in detection of the query gesture. For example, a corner to corner gesture within a rectangular or triangular guide may be considered a query gesture.

A film 1402, which may be a thin polymeric material, may be disposed in within the large guide 1404. The film 1402 is shown with large cutouts 1408 at 12, 3, 6, and 9 o'clock locations and small cutouts 1410 at 1, 2, 4, 5, 7, 8, 10, and 11 o'clock locations to provide another tactile indication of the current location of a touch. Depending on the manner in which the touch-sensitive display 118 detects the query gesture, e.g., by capacitive or resistive touch sensors, the film 1402 may have electrical properties or be sufficiently thin such that the film 1402 does not alter the ability of the touch-sensitive display 118 to detect the gesture. The film 1402 may also protect the touch-sensitive display 118.

The small guide 1406 may be utilized for a query gesture that is a single or multiple touch, such as a single tap or double tap, potentially of variable force. Such a query gesture may request information about the time until a next meeting in a calendar application or a statistic relating to an email or voicemail. When a query gesture is detected in the region of the touch-sensitive display 118 aligned with the small guide 1406, tactile feedback is provided that communicates information related to the gesture.

A holster 1500 with guides associated with functions for a media player is shown in FIG. 15. The media player includes a plurality of guides 1502, 1504, 1506, 1508, 1510, 1512, 1514, 1516, 1518 to facilitate a number of functions. The guides include a "volume" guide 1502 comprising a long rectangular slot, and a query gesture detected in the region of the touch-sensitive display 118 associated with the slot 1502 adjusts the volume. For example, a swipe in one direction, e.g., an upward swipe, increases volume and a swipe in the opposite direction, e.g., a downward swipe, decreases volume. Alternatively, a tap at a specific location along the slot may select a specific volume level, e.g., a tap at the top of the slot selects the highest volume, or a press sufficient to actuate an actuator half-way along the length of the slot selects half volume level. Other guides facilitate other functions such as pause 1504, play 1506, previous track 1508, next track 1510, stop 1512, record 1514, rewind 1516 and fast-forward 1518. These guides 1502, 1504, 1506, 1508, 1510, 1512, 1514, 1516, 1518 are shown as holes or openings that match the shapes that are standard representations for these functions in a media player. A user may select a feature by touching the touch-sensitive display 118 in the region accessible through the guide 1502, 1504, 1506, 1508, 1510, 1512, 1514, 1516, 1518 or by pressing on the holster at the location of the relevant guide with sufficient force to depress or actuate the actuator 120 or to exceed a force threshold. By triggering a function or feedback through a holster with a force that exceeds a threshold and/or actuates an actuator, inadvertent touches on the holster do not result in functions being performed or tactile feedback being provided. The guides 1502, 1504, 1506, 1508, 1510, 1512, 1514, 1516, 1518 may optionally be aligned with the same regions where the functions are displayed on the touch-sensitive display 118 when the device 100 is unholstered, i.e., during normal operation, to facilitate easier location by a user without having to look at the holster.

A simple holster 1600 with two guides 1602, 1604 is shown in FIG. 16. The two guides 1602, 1604 may be utilized to facilitate provision of various different pieces of information. For example, the edge of the circular guide 1602 may be traced in a clockwise direction to request current time as tactile feedback, such as described above. A tap or double tap on the touch-sensitive display 118 in the region accessible through the guide 1602 may request time to a next meeting. A depression of the touch-sensitive display 118 in the region accessible through the guide 1602, which depression is sufficient to actuate an actuator 120 or to meet a force threshold may request the number of missed calls. The edge of the rectangular guide 1604 may be traced to request, for example, the number of unread emails as tactile feedback, such as described above. A tap or double tap on the touch-sensitive display 118 in the region accessible through the guide 1604 may also request the number of unread emails. A depression of the touch-sensitive display 118 in the region accessible through the guide 1604, which depression is sufficient to actuate an actuator 120 or to meet a force threshold may request the number of missed calls.

Detection of a query gesture may result in performance of a function, such as provision of tactile feedback that imparts information or may activate a feature in an application such as a media player. Tactile feedback may also be provided to notify the user that a query gesture was identified.

The touch-sensitive display 118 may display information based on the orientation of the display 118. For example, when the device is held in a portrait orientation, information is displayed in a portrait orientation. Alternatively, when the device is held in a landscape orientation, information is displayed in a landscape orientation. The orientation of the displayed information may automatically follow the orientation of the device by utilizing the accelerometer 136 to detect orientation. The locations of selection options may be different in portrait and landscape orientations. When the portable electronic device 100 is holstered, the accelerometer 136 may be disengaged or its data disregarded to ensure alignment of the guides with the monitored regions of the touch-sensitive display 118 for all device 100 orientations.

Query gestures generally need not have an orientation correlated to the orientation of the touch-sensitive display 118, e.g., a gesture in the shape of an "8" or an "∞" sign may be interpreted as requesting the same information. The query gestures need not be perfect, e.g., the query gestures need not comprise exactly 90 degree corners for rectangles, constant radius for circular gestures, and so forth.

The methods and devices disclosed facilitate a user request, in the form of a query gesture, for information from a portable electronic device. Instead of waiting for the device to provide a notification or reminder, the user may proactively request information from the device. Advantageously, the user need not look at the touch-sensitive display to either request or receive information while in conversation, in a meeting, or when otherwise looking at the device may be difficult or socially unacceptable. Such tactile feedback may be advantageous to the visually impaired. This non-visual operation facilitates provision of information via tactile feedback. Tactile feedback may be provided while the portable electronic device is in a pocket or holster. The entire touch-sensitive display may be monitored for a query gesture, or Power reduction may be facilitated when the portable electronic device is holstered by monitoring less than the total area of the touch-sensitive display, for example, by monitoring only regions aligned with guides on the holster.

A query gesture is detected on a touch-sensitive display of a portable electronic device. In response to the query gesture, an actuator is actuated to provide tactile feedback including information associated with the query gesture.

A portable electronic device is also disclosed that includes a touch-sensitive display, an actuator, and a microprocessor. The microprocessor is configured to detect a query gesture on the touch-sensitive display and, in response to detecting the query gesture, actuate the actuator to provide tactile feedback including information associated with the query gesture.

A holster comprises a body having a guide and having a pocket for receiving a portable electronic device, wherein the guide is aligned with an area of a touch-sensitive display of the portable electronic device that is disposed in the holster, and wherein the guide is tactilely locatable.

A method comprises detecting when a portable electronic device having a touch-sensitive display is disposed in a holster and monitoring an area of the touch-sensitive display for a query gesture. When the query gesture is detected in association with the area, a function is performed associated with the query gesture.

A method comprises when a portable electronic device having a touch-sensitive display is disposed in a holster, monitoring an area of the touch-sensitive display for a gesture. When the gesture is detected in association with the area, a function associated with the gesture is performed.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:
1. A method comprising:
  detecting a gesture on a touch-sensitive display of an electronic device;

identifying a type of the gesture based on touch attributes of the gesture and determining information requested by the gesture;

in response to detecting the gesture and identifying the type of gesture, actuating an actuator to provide tactile feedback to communicate the information by indicating a number of unread or unanswered messages received at the electronic device or a number of calls missed at the electronic device.

2. The method according to claim 1, wherein actuating the actuator to provide tactile feedback is carried out prior to completion of the gesture.

3. The method according to claim 1, comprising monitoring for the gesture in an area of a touch-sensitive display that comprises only part of the touch-sensitive display and wherein the actuator is actuated to communicate the information in response to detecting the gesture in the area of the touch-sensitive display.

4. The method according to claim 1, wherein attributes of the tactile feedback depend on attributes of the gesture.

5. The method according to claim 1, wherein the tactile feedback provided is dependent on the force with which the gesture is applied.

6. The method according to claim 1, wherein the gesture is associated with information that is not displayed on the touch-sensitive display.

7. The method according to claim 1, wherein the tactile feedback is provided in pulses to indicate a quantity.

8. A non-transitory computer readable storage medium having stored instructions executable by a processor of a portable electronic device to cause the portable electronic device to:

detect a gesture on a touch-sensitive display of the portable electronic device;

identify a type of the gesture based on touch attributes of the gesture and determine information requested by the gesture;

in response to detecting the gesture and identifying the type of gesture, actuate an actuator to provide tactile feedback to communicate the information by indicating a number of unread or unanswered messages received at the electronic device or a number of calls missed at the electronic device.

9. The non-transitory computer readable storage medium according to claim 8, wherein the stored instructions are executable by the processor to cause the portable electronic device to monitor for the gesture in an area of the touch-sensitive display that comprises only part of the touch-sensitive display and to actuate the actuator to communicate the information in response to detecting the gesture in the area of the touch-sensitive display.

10. The non-transitory computer readable storage medium according to claim 8, wherein attributes of the tactile feedback depend on attributes of the gesture.

11. The non-transitory computer readable storage medium according to claim 8, wherein the tactile feedback provided is dependent on the force with which the gesture is applied.

12. The non-transitory computer readable storage medium according to claim 8, wherein the gesture is associated with information that is not displayed on the touch-sensitive display.

13. The non-transitory computer readable storage medium according to claim 8, wherein the tactile feedback is provided in pulses to indicate a quantity.

14. A portable electronic device comprising:

a touch-sensitive display;

an actuator;

a microprocessor coupled to the touch-sensitive display and the actuator and configured to:

detect a gesture on a touch-sensitive display of an electronic device;

identify a type of the gesture based on touch attributes of the gesture and determine information requested by the gesture;

in response to detecting the gesture and identifying the type of gesture, actuate the actuator to provide tactile feedback to communicate the information by indicating a number of unread or unanswered messages received at the electronic device or a number of calls missed at the electronic device.

15. The portable electronic device according to claim 14, wherein the microprocessor is configured to actuate the actuator to provide tactile feedback prior to completion of the gesture.

16. The portable electronic device according to claim 14, wherein the microprocessor is configured to monitor for the gesture in an area of the touch-sensitive display that comprises only part of the touch-sensitive display and wherein the actuator is actuated to communicate the information in response to detecting the gesture in the area of the touch-sensitive display.

17. The portable electronic device according to claim 14, wherein attributes of the tactile feedback depend on attributes of the gesture.

18. The portable electronic device according to claim 14, wherein the tactile feedback provided is dependent on the force with which the gesture is applied.

19. The portable electronic device according to claim 14, wherein the gesture is associated with information that is not displayed on the touch-sensitive display.

20. The portable electronic device according to claim 14, wherein the tactile feedback is provided in pulses to indicate a quantity.

* * * * *